United States Patent [19]

Seidel

[11] Patent Number: 4,773,620
[45] Date of Patent: Sep. 27, 1988

[54] CONTROL SURFACE ACTUATOR

[75] Inventor: Gerhard E. Seidel, Renton, Wash.

[73] Assignee: The United States of America as represented by the Administrator of the National Aeronautics and Space Administration, Washington, D.C.

[21] Appl. No.: 28,832

[22] Filed: Mar. 23, 1987

[51] Int. Cl.$^4$ .............................................. B64C 13/36
[52] U.S. Cl. .................................... 244/75 R; 244/78
[58] Field of Search ............. 244/78, 75 R, 213, 215, 244/221, 220, 226, 227

[56] References Cited

U.S. PATENT DOCUMENTS 3,338,139  8/1967  Wood ................................... 244/78
4,426,911  1/1984  Robinson et al. .................. 244/75 R
4,595,158  6/1986  Robinson ............................. 244/78

Primary Examiner—Galen Barefoot
Attorney, Agent, or Firm—George E. Helfrich; John R. Manning; Charles E. B. Glenn

[57] ABSTRACT

A device which actuates aircraft control surfaces is disclosed. The actuator 19 is disposed entirely within the control surface structure 15. Because the actuator 19 is disposed entirely within the control surface 15, the gap 14 between the wing structural box 13 and control surface 15 may be reduced. Reducing the size of the gap 14 is especially desirable for wings with high aspect ratio, wherein the volume of structural box 13 is at a premium.

1 Claim, 2 Drawing Sheets

CONTROL SURFACE ACTUATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

TECHNICAL FIELD OF THE INVENTION

This invention relates to a device which actuates aircraft control surfaces. More particularly, the present invention relates to such a device which is entirely contained within the control surface structure. The control surface may be any movable airfoil or surface including ailerons, flaps, elevators, trim tabs, flaperons, rudders or spoilers.

BACKGROUND OF THE INVENTION

The prior art describes numerous devices for actuating aircraft control surfaces. The use of hydraulic, pneumatic and mechanical activating devices, comprised of pistons, pulleys, bell cranks, universal joints and worm gears are well known. A control surface actuator capable of being disposed entirely within a control surface, however, has not been demonstrated. In conventional aircraft with relatively low aspect ratio (length divided by mean width) wings, a gap or space is set aside in the wing between the structural box which houses fuel tanks and the control surface. Within the gap are housed the actuators for the control surfaces. Many modern aircraft, however, utilize high aspect ratio, e.g., long, narrow wings. High aspect ratio wings provide reduced aerodynamic drag, and thus serve to increase the overall fuel economy of an aircraft. As the width of a wing is decreased, it becomes increasingly important to utilize all available wing structural box area for fuel storage. Any reduction in the size of the gap between the structural box and the control surface adds much needed volume to the structural box of the wing.

Accordingly, there remains a need for a control surface actuator whereby the actuator is housed entirely within the control surface structure. Moving the actuator into the control surface structure allows the gap between the wing structural box and the control surface to be reduced.

It is therefore an object of the present invention to provide a device which actuates an aircraft control surface in response to pilot operated control and linkage mechanism.

It is a further object of the present invention to provide an actuating device housed entirely within the control surface stucture, permitting wing structural box volume to be maximized.

It is yet another object of the present invention to provide an actuating device, the use of which is not limited to aircraft.

SUMMARY OF THE INVENTION

According to the present invention, the foregoing and additional objects are achieved by providing a device comprising an input lever, a universal joint, a hydraulic swivel, and a hydraulically powered piston, all contained within the control surface to be actuated. A mechanical input force is transmitted from conventional pilot operated controls through conventional cables or rods to the input lever of the actuator. From the input lever, the input force is transmitted through a universal joint and a series of rods and levers to a hydraulic swivel. The hydraulic swivel controls the input of hydraulic power to the hydraulic piston. The base of the piston is pivoted to a trunnion mounted on the control surface facing edge of the wing, while the shaft of the piston is pivoted to a point inside the control surface structure. Because the base and the shaft of the piston are pivoted to fixed points, the extension or retraction of the piston shaft causes deflection of the control surface.

DETAILED DESCRIPTION OF THE INVENTION

Figure 1:
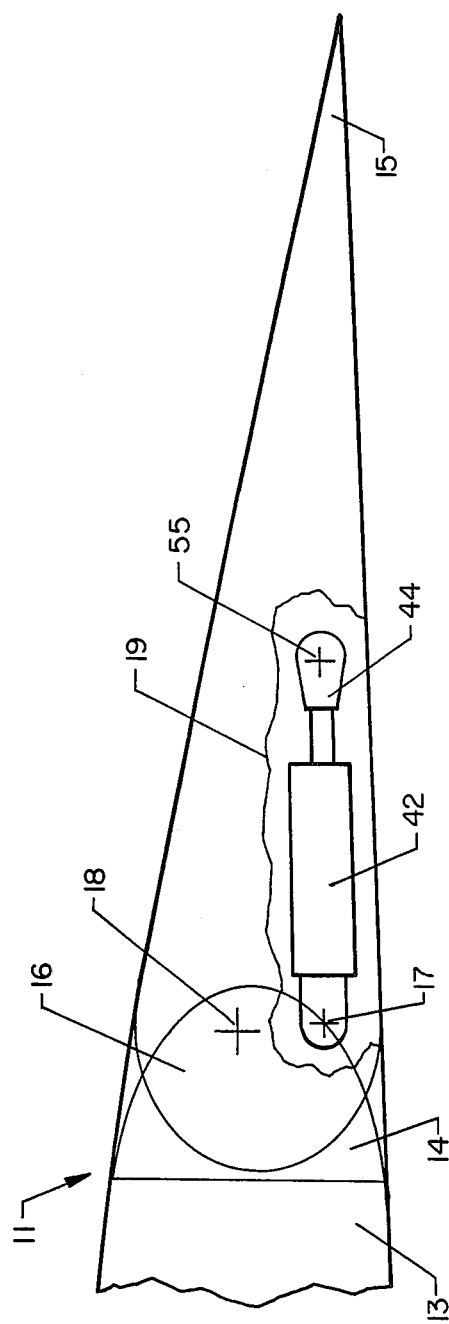
FIG. 1 is a sectional side view of a control surface showing the preferred embodiment of the present invention installed within the control surface of an aircraft wing.

Referring now to the drawings, there is illustrated a preferred embodiment of the invention as it would be installed within a control surface of an aircraft. FIG. 1 shows a wing structure, designated generally by the reference numeral 11, comprised of three major components, the structural box 13, the gap 14, and the control surface 15.

Brackets, one of which is shown in FIG. 1 and designated by reference numberal 16, are mounted along the control surface facing edge of wing 11. Control surface 15 is pivotally connected to bracket 16 at pivot point 18. Piston 42 of actuator 19 is also pivotally connected to bracket 16, but at a pivot point 17 offset from pivot point 18 of control surface 15. Piston shaft 44 is fixedly attached to flap 15 at point 55.

Figure 2:
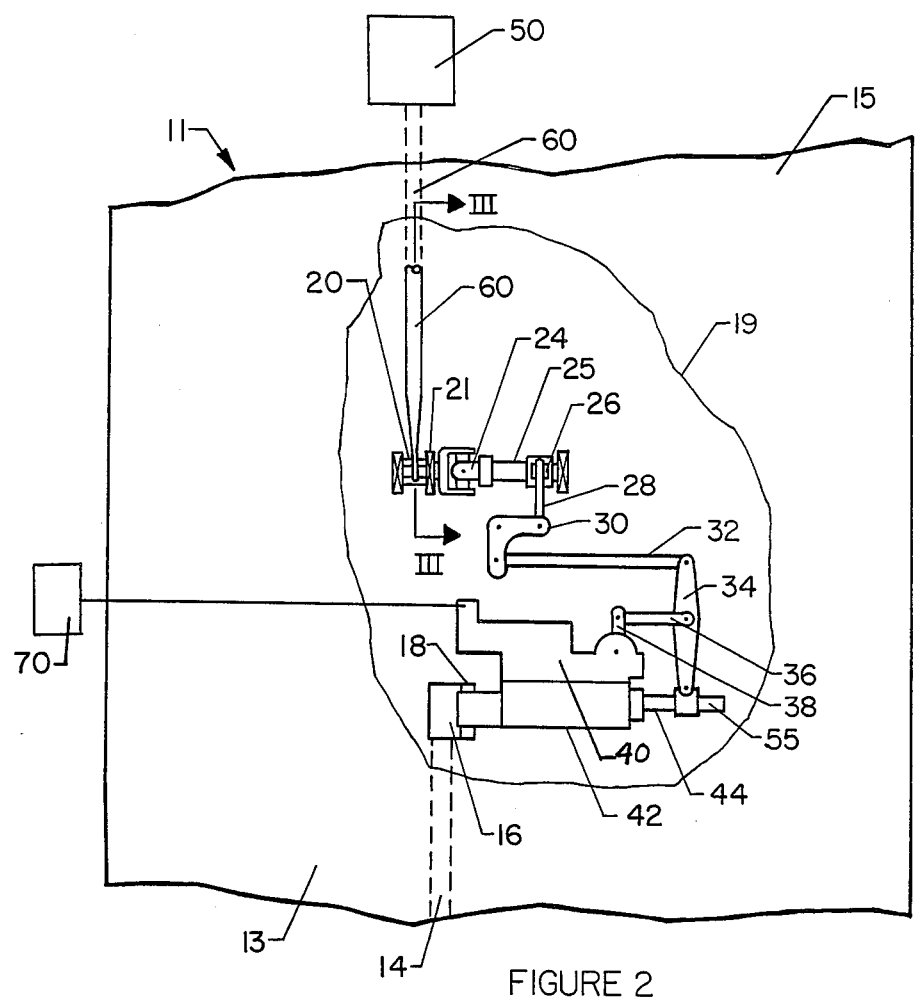
FIG. 2 is a top view of the present invention showing the linkage of a source of mechanical input to the hydraulic swivel which in turn controls the hydraulic piston.
Figure 3:
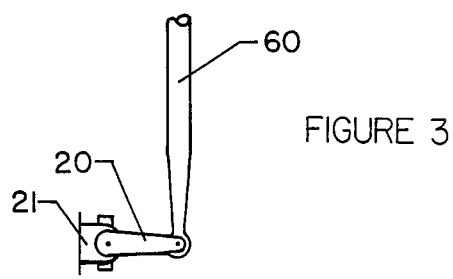
FIG. 3 is a partial view of the linkage taken along lines III—III of FIG. 2.

Referring now to FIG. 2, conventional pilot operated controls 50 are connected to actuator 19 through conventional aircraft linkage 60 pivotally connected to input arm 20 of actuator 19. Linkage 60 may be a flexible cable, a rod or any other known linkage mechanism or combination thereof. Input arm 20 is fixedly connected to shaft 21 which is in turn connected to shaft 25 through universal joint 24. The connection of input arm 20 to linkage 60 and shaft 21 is more clearly shown in FIG. 3. Universal joint 24 serves to isolate input arm 20 and linkage 60 from the angular rotation of control surface 15. Arm 26 is fixedly attached to and extends from shaft 25. One end of connecting rod 28 is pivotally connected to arm 26 and the opposite end of connecting arm 28 is pivotally connected to bell crank 30. Connecting rod 32 serves to pivotally connect bell crank 30 with one end of lever arm 34. The opposite end of lever arm 34 is pivotally connected to piston shaft 44 of piston 42. The base portion of piston 42 is pivotally attached to bracket 16 at point 18, while piston shaft 44 is fixedly attached to flap 15 at point 55. Input arm 38 of hydraulic controller 40 is pivotally connected to the mid-section of lever arm 34 by actuating rod 36. The individual components of actuator 19 described hereinabove are constructed of steel, aluminum or any other suitable material.

The mechanism described thus serves to transmit a mechanical input signal from the pilot operated controls 50 to the hydraulic controller 40. Conventional hydraulic power is regulated by hydraulic controller 40 in response to movement of hydraulic controller input arm 38. The operation of hydraulic swivels is generally known in the art and is not claimed as part of the present invention. Under the control of hydraulic controller 40, hydraulic power is transmitted from a conventional hydraulic power supply 70 to hydraulic piston 42 to extend or retract piston shaft 44. As described hereinbefore, piston 42 is pivoted at a point 17 offset from the pivot point 18 of the control surface, and piston shaft 44 is fixedly attached within flap 15 at point 55. Thus, as piston shaft 44 is extended or retracted, a torque is applied to control surface 15, causing deflection of the control surface 15 about pivot point 17.

OPERATION OF THE INVENTION

The operation of the present invention is now believed apparent. FIG. 2 illustrates that conventional pilot operated controls 50 transmit a mechanical input force via aircraft linkage 60. The force transmitted through linkage 60 causes movement of input arm 20. This motion is transmitted through arm 20, imparting a rotation to shaft 21. The rotation of shaft 21 is transmitted through universal joint 24 causing rotation of shaft 25. Rotation of shaft 25 causes the movement of arm 26, corresponding movement of connecting rod 28, bell crank 30, and connecting rod 32. The movement of connecting rod 32 applies a force at one end of lever arm 34, as the other end of lever arm 34 is pivoted to piston shaft 44. As lever arm 34 moves, actuator rod 36 transmits this motion to input arm 38 of hydraulic controller 40.

In response to the mechanical input force which is received by input arm 38, hydraulic controller 40 controls the flow of hydraulic fluid from a conventional hydraulic power supply 70 to hydraulic piston 42. Piston shaft 44 is mounted to flap 15 at point 55 such that the mid-point of shaft extension corresponds to 0° control surface deflection. As shaft 44 is extended, the control surface is deflected upward. If shaft 44 is retracted past the mid-point, the control surface is deflected downward.

While the present invention has been described with reference to particular embodiments thereof, it will be understood, of course, that certain changes, modifications and substitutions will be apparent to those skilled in the art without departing from the spirit and scope of the claims. For example, the control surface actuator of the present invention is well suited for installation within aircraft wings of any aspect ratio, allowing the gap of these wings to be reduced or put to other use. The present actuator is also suited for installation within the tail structure of aircraft, or for installation within any vehicle employing control surfaces.

What is claimed as new and desired to be secured by Letters Patent of the United States is:

1. In an aircraft control surface actuating system including a control surface, pilot operated cockpit controls, linkage from said cockpit controls to said control surface through which a force is applied, by manipulation of the cockpit controls, to a device which in turn actuates said control surface, the improvement therein comprising a control surface actuating means which is contained entirely within said control surface, the control surface actuating means comprising:

means for introducing a mechanical input force;
  coupling means for transferring said mechanical input force;
  power supply means for providing a hydraulic actuating force;
  hydraulic controller means fo receiving the transferred mechanical input force and regulating the supply of said hydraulic actuating force in response to the received mechanical input force;
  piston means, including a piston shaft which extends and retracts, the extension and retraction of said piston shaft being in response to forces applied by said power supply means, so that the extension and retraction of said piston shaft causes deflections of said control surface.

* * * * *